United States Patent
Weik et al.

(10) Patent No.: US 7,702,923 B2
(45) Date of Patent: Apr. 20, 2010

(54) STORAGE SERVICE

(75) Inventors: Hartmut Weik, Hummelbergstr (DE);
Manfred Laube, Fröbelstr (DE);
Manfred Weiss, Brunnenstr (DE)

(73) Assignee: Alcatel, Paris (FR)

( * ) Notice: Subject to any disclaimer, the term of this patent is extended or adjusted under 35 U.S.C. 154(b) by 1542 days.

(21) Appl. No.: 10/991,945

(22) Filed: Nov. 19, 2004

(65) Prior Publication Data

US 2005/0138404 A1    Jun. 23, 2005

(30) Foreign Application Priority Data

Dec. 22, 2003  (EP)  ............................. 03293318

(51) Int. Cl.
*G06F 12/14* (2006.01)
(52) U.S. Cl. ........................ 713/193; 709/214
(58) Field of Classification Search ................ None
See application file for complete search history.

(56) References Cited

U.S. PATENT DOCUMENTS

| | | | |
|---|---|---|---|
| 6,405,315 | B1 | 6/2002 | Burns et al. |
| 2002/0049778 | A1 | 4/2002 | Bell et al. |
| 2002/0143888 | A1* | 10/2002 | Lisiecki et al. ............. 709/214 |
| 2003/0084290 | A1* | 5/2003 | Murty et al. ................ 713/168 |
| 2003/0135385 | A1 | 7/2003 | Karpoff |

FOREIGN PATENT DOCUMENTS

WO    WO 01/65545 A2    9/2001

OTHER PUBLICATIONS

Computer Associates et al: "Securing Networked Data Storage," SNIA Storage Security Industry Forum, 'Online! Jan. 1, 2003, pp. 1-15, XP002278972, retrieved from the Internet: URL:http//www.storagesearch.com/decru-art-1.pdf> Retrieved on May 1, 2004.

* cited by examiner

*Primary Examiner*—Brandon S Hoffman
(74) *Attorney, Agent, or Firm*—Sughrue Mion, PLLC

(57) ABSTRACT

The invention concerns a method of providing a client (21, 22, 23, 24) transparent access to storage space administrated by a storage service, as well as a client (21, 22, 23, 24) and a storage system for performing this method. Data are exchanged between the client (21, 22, 23, 24) and the storage system (5) providing the storage service via a communication network (1). A client (24) invokes the storage service for providing the storage space. The storage space associated with the client (24) is located within the storage system (5). A secure connection is established between the client (24) and a storage device (51) of the storage system (5) dedicated to store data assigned to said storage space. Data assigned to the storage space is stored in encrypted form in said storage device (51).

11 Claims, 2 Drawing Sheets

3:      communication unit
24:     client
31:     modem control handler
32:     Internet handler
33:     data transfer handler
34:     encryption/decryption handler
35-36:  encryption/decryption machines
37:     key data base
38:     query handler
46-49:  application programs
71, 75: first data sets
72, 76: second data sets
73:     query message
74:     specific decryption key
51:     storage server
511:    communication unit
512:    data access unit
513:    decryption machine
514:    data base

| | |
|---|---|
| 1: | communication network |
| 3: | communication units |
| 5: | storage system |
| 6: | service control server |
| 21-24: | clients |
| 41-47: | application programs |
| 51-52 and 56-58: | service control servers |
| 53: | streamer |
| 54-55 and 62: | data bases |
| 61: | service control unit |

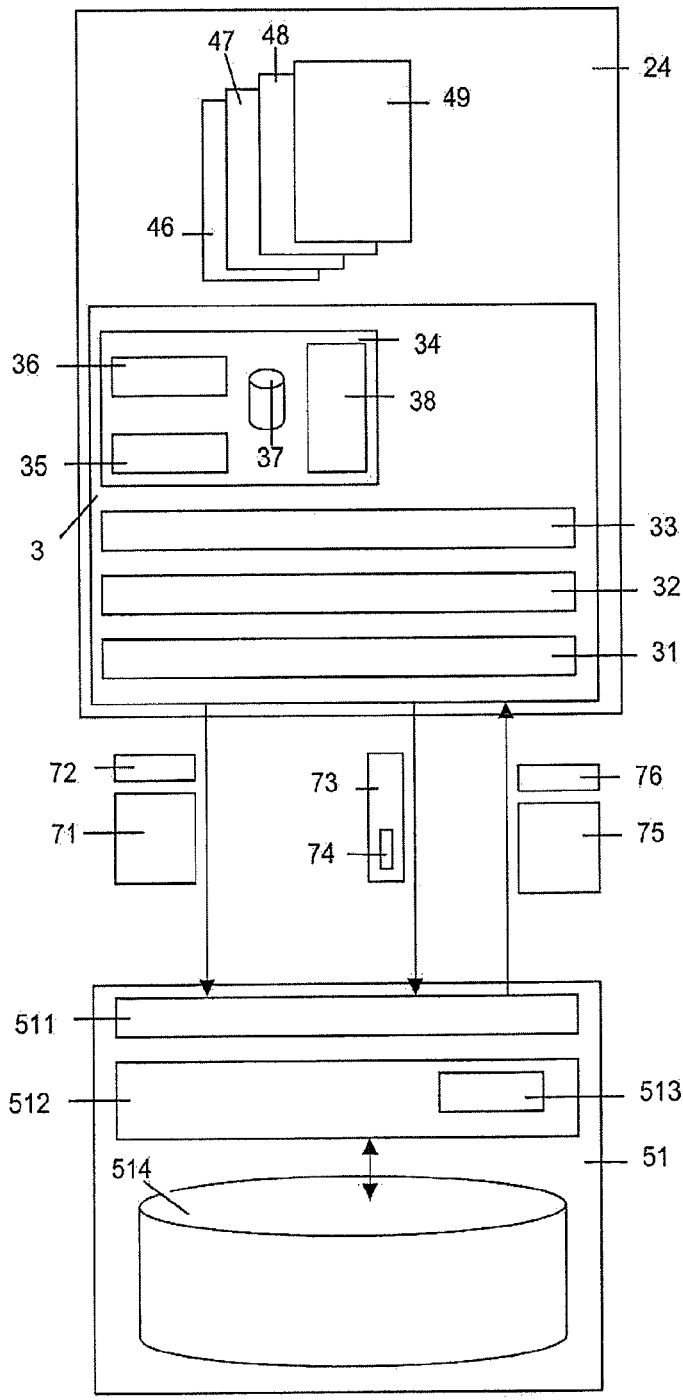

Fig. 2

| | |
|---|---|
| 3: | communication unit |
| 24: | client |
| 31: | modem control handler |
| 32: | Internet handler |
| 33: | data transfer handler |
| 34: | encryption/decryption handler |
| 35-36: | encryption/decryption machines |
| 37: | key data base |
| 38: | query handler |
| 46-49: | application programs |
| 71, 75: | first data sets |
| 72, 76: | second data sets |
| 73: | query message |
| 74: | specific decryption key |
| 51: | storage server |
| 511: | communication unit |
| 512: | data access unit |
| 513: | decryption machine |
| 514: | data base |

STORAGE SERVICE

TECHNICAL FIELD

The invention relates to a method of providing a client transparent access to storage space administrated by a storage service, wherein data are exchanged between the client and a storage system providing the storage service via a communication network. The invention further relates to a client and a storage system for executing this method.

The invention is based on a priority application, EP 03293318.6, which is hereby incorporated by reference.

BACKGROUND OF THE INVENTION

Traditionally, information storage has to be performed local to the computer that creates, gathers and processes such information. However, stored information has become too valuable in many circumstances to assume risk associated with the locality of its storage and the burden to perform a complicated local backup strategy.

To overcome these disadvantages several approaches are discussed to implement a centralized external information storage and management.

For example, U.S. 2002/0049778 A1 describes a method for providing information outsourcing. A storage node is located remotely from an information outsourcing enterprise. The enterprise communicatively couples to the storage node to transfer information between the enterprise and the storage node in real-time to enable primary storage, static and dynamic mirroring, and backup and disaster recovery of enterprise information. A plurality of enterprises that are located remotely with respect to the storage node are communicatively coupled to the storage node by way of communication channels having sufficient performance characteristics to enable said storage node to provide primary storage services to these enterprises. The storage node stores the information transferred from said plurality of enterprises. The enterprise may enter requests to update the amount of reserved storage space at the storage node. The transfer of information between the storage node and the enterprises is performed in a manner that is substantially transparent to application programs executing at the enterprise. Further, multiple storage nodes can be communicatively connected to enable the system to transfer information between them.

SUMMARY OF THE INVENTION

It is the object of the present invention to provide clients an improved storage service via a communication network.

BRIEF DESCRIPTION OF THE INVENTION

The object of the present invention is achieved by a method of providing a client transparent access to storage space administrated by a storage service comprising the steps of: exchanging data between the client and a storage system providing the storage service via a communication network; invoking the storage service for providing the storage space to the client; locating the storage space associated with the client within the storage system; establishing a secure connection between the client and a storage device of the storage system dedicated to store data assigned to said storage space; and storing data assigned to the storage space in encrypted form in said storage device. The object of the present invention is further achieved by a client with a communication unit for providing transparent access to storage space administrated by a storage service, the communication unit having means for exchanging data with a storage system providing the storage service via a communication network, for invoking the storage service for providing the storage space to the client, for establishing a secure connection with a storage device of the storage system dedicated to store data assigned to said storage space, for encrypting data assigned to the storage space by means of a clients specific encryption key and for transmitting the encrypted data assigned to the storage space to the storing service to be stored in encrypted form in said storage device. The object of the present invention is further achieved by a storage system for providing a client transparent access to storage space administrated by a storage service, wherein the storage system comprises a service control unit and at least one storage device having a communication unit for exchanging data with the client via a communication network, wherein the service control unit is adapted to locate the storage space associated with the client within the storage system, when the client invokes the storage service for providing the storage service and to support the establishment of a secure connection between the client and the storage device or storage system dedicated to store data assigned to said storage space, and wherein the at least one storage device is adapted to store data assigned to the storage space in encrypted form.

Various advantages are achieved by the present invention. It provides a cheap and secure rent-service platform. The information assigned to a client may be stored in distributed form on one or several of a plurality of storage media granting a cheap and fail-prove storage of data. Since data are transferred via a secure connection and stored in encrypted form in the storage device, the method guarantees a high degree of data privacy. Combined with the distributed architecture of the storage service it provides a cheap, save and secure storage service for enterprise and private applications.

Further advantages are provided by the embodiment of the invention indicated by the dependent claims.

According to a preferred embodiment of the invention, the client encrypts data assigned to the storage space by means of a clients specific encryption key. The encrypted data are submitted to the storage service and stored in the storage device in an encrypted form. When retrieving data, the client decrypts data retrieved from the storage space by means of an associated client specific decryption key. Such approach guarantees a high degree of security and privacy. Only the client associated with a storage space is in a position to decrypt and understand associated data stored in a storage device of the storage system. Even the storage system cannot decrypt the content of data managed and administrated by itself.

Further improvements of security and privacy are achievable by implementing the following approach: data structure data of the storage space are stored in encrypted form in the associated storage device. Since it is not possible for a third party to identify borders between different data entities of the stored data it becomes much harder for such third party to start a fraudulent decryption attack.

According to a further preferred embodiment of the invention, it is possible for a subscriber to shift his clients specific encryption key from one computer to another computer. Thereby, it becomes possible for him to have access to his network side storage space from different computers. For example, the clients specific encryption key is stored on a storage medium and transfers by means of the storage medium to another computer. But, it is also possible to use an encryption key administration server which supports the transfer of an encryption key from one computer to another computer. For example, the already existing private key infrastructure (PKI) may be used for performing this task. Further, it is possible that a client specific encryption key is assigned to a user group. Each member of this user group has access to the encryption key and is therefore in a position to access the storage space provided by the storage service. Further it is possible that the storage space assigned to a client is subdivided in different sub-storage spaces with different assigned encryption keys. Due to such subdivision it becomes possible to assign different access rights to different sub-storage spaces. For example, a specific set of data, e.g. telephone directory data or times scheduling data may be shared by the members of a user group while the rest of the data of the storage space reserved to one of the members of the user group.

For implementing such approach, the client encrypts data structure data associated with data assigned to the storage space by means of a clients specific encryption key. Then, it submits a first data set to the storage service including encrypted data and a second data set including encrypted data structure data associated with said encrypted data. The storage service handles the storage of these data sets in a storage device associated with this storage space of the client. If the client later on intends to retrieve data, the client preferably applies following approach: The client submits a query to the storage service, the query including a query request and a client specific decryption key for decrypting encrypted data structure data of the storage space. The storage system decrypts the data structure data of the storage space by means of the received encryption key and computes the query request. Thereby, a high degree of safety and security combined with reduced bandwidth requirements are achieved.

Alternatively, the client submits a query request to the storage service. The storage service submits encrypted data and associated encrypted data structure data of the storage space back to the client. The client decrypts the encrypted data structure data for computing the query request. Such approach increases safety and privacy, but increases bandwidth requirements, too.

Preferably, the communication network is a public communication network, in particular an IP network. This guarantees a cheap and simple possibility for a wide variety of clients to access the storage service. Thanks to the specific functionalities of the storage service, privacy, safety and security of data are guaranteed in such kind of environment, too.

The security of the storage system is further improved, if the storage system distributes the storage space among two or more storage devices constituting a distributed storage network. Further, such approach may bring down overall system costs.

BRIEF DESCRIPTION OF THE DRAWINGS

These as well as other features and advantages of the invention will be better appreciated by reading the following detailed description of presently preferred exemplary embodiments taken in conjunction with accompanying drawings of which:

FIG. 2 is a functional view of a client and a storage device of FIG. 1.

DETAILED DESCRIPTION OF THE INVENTION

Figure 1:
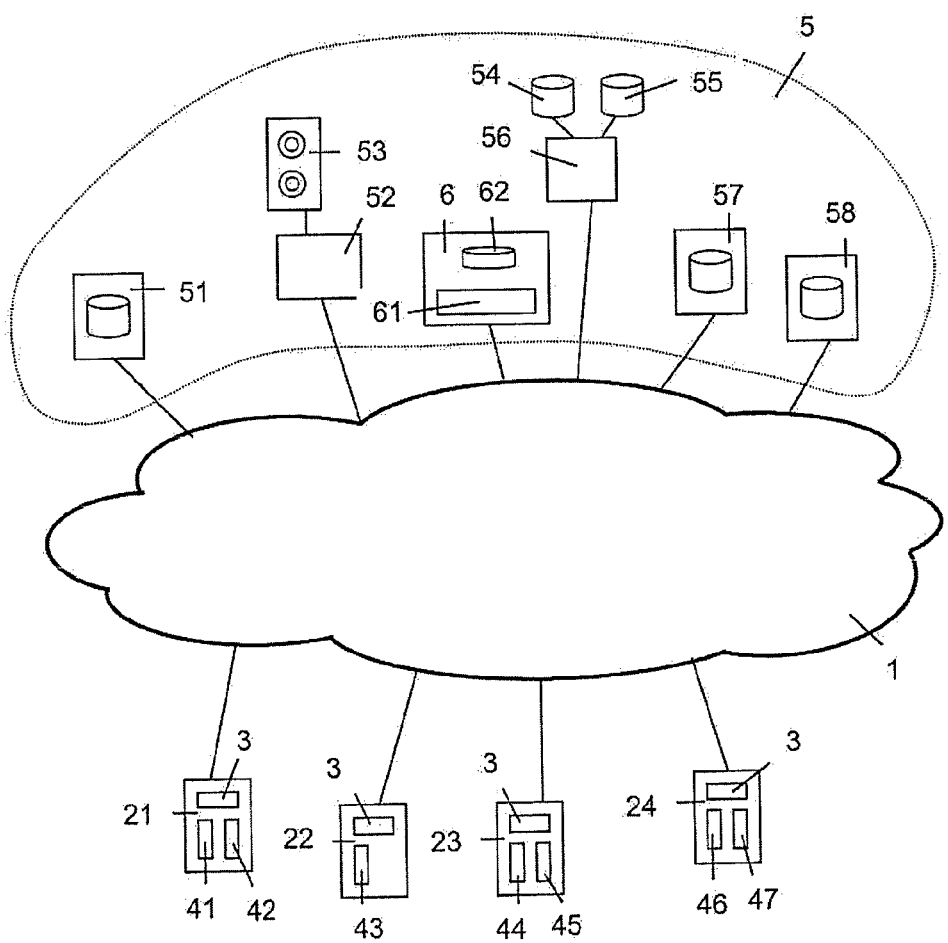
FIG. 1 is a block diagram of a communication environment showing a storage system and several clients equipped according to the present invention.

FIG. 1 shows a communication network 1, a storage system 5 and several clients 21, 22, 23 and 24.

The communication network 1 is a data network enabling the communication between the clients 21, 22, 23 and 24 with elements of the storage system 5. Preferably, the communication network 1 is an IP network (IP=Internet Protocol) composed of a plurality of physical networks interlinked via a level 3 IP layer. For example, these physical networks are ATM, Ethernet and/or MPLS networks (ATM=Asynchrone Transfer Mode; MPLS=Multiprotocol Label Switching). Further, it is possible that the communication network 1 comprises one or several PSTN networks or ISDN networks (PSTN=Public Switched Telecommunication Network; ISDN=Integrated Services Digital Network) that makes it possible for a client to access elements of the storage system 5 via a PSTN or ISDN network. These PSTN or ISDN networks may be assigned to different network operators. Further, it is possible that the communication network 1 comprises one or several wireless access networks, for example cellular radio networks, e.g. according to the GSM or UMTS or IS-95 or CDMA 2000 standard (GSM=Global System for Mobile Communication; UMTS=Universal Mobile Telecommunications) or a wireless LAN network (LAN=Local Area Network).

The clients 21, 22, 23, 24 are terminals having communication capabilities for communicating via the communication network 1. Preferably, the clients 21, 22, 23 and 24 are computers interlinked with the communication network 1 via a DSL modem (DSL=Digital Subscriber Line). But, it is also possible that the clients 21, 22, 23 and 24 or a part of these clients are mobile terminals, for example a cellular phone, a smart phone or PDA (PDA=Personal Digital Assistant) equipped with a communication interface for communicating via a cellular network or wireless LAN network.

Each of the clients 21, 22, 23 and 24 have a communication unit 3 adapted to access the storage service provided by the storage system 5 and to handle the whole communication process necessary for providing the storage service to application programs executed by the respective one of the clients 21, 22, 23 and 24. For example, the client 21 has application programs 41 and 42, the client 22 an application program 43, the client 23 has application programs 44 and 45 and the client 24 has application programs 46 and 47 that access data stored and administrated by help of the storage service provided by the storage system 5.

The storage system 5 is composed of a plurality of servers connected to the communication network 1. For example, FIG. 1 shows several of such servers, namely five storage servers 51, 52, 56, 57 and 58 and a service control server 6. The storage servers 51, 57 and 58 are composed of a server running a data base that provides storage space to subscribers of the storage service provided by the storage system 5. The storage server 52 provides access to a streamer 53 used for the backup strategy of the storage system 5. The storage server 56 provides access to a set of data bases, for example the data bases 54 and 55, which are not connected to the communication network 1 neither providing the necessary functionalities for acting as storage device in the context of provisioning the storage service.

The service control server 6 is composed of one or several computers forming a hardware platform, a software platform and several application programs executed by the system platform composed of the hardware and software platform. The functionalities of the service control server 6 are provided by the execution of this software by the hardware platform of the service control server 6. From functional point of view, the service control server 6 has a service control unit 61 and a data base 62.

The service control unit 61 controls the provisioning of the storage service to clients, for example to the clients 21, 22, 23 and 24. It controls the distribution of storage space provided to clients among the storage devices of the storage system 5. Further, it administrates the storage space available in the storage system 5, and controls backup, security and safety procedures executed within the storage system 5 to guarantee a high quality of service.

For example, the storage servers 51, 52, 56, 57 and 58 are enrolled as storage devices in the data base 62 of the service control server 6. The data base 62 holds a data structure interlinking the enrolled storage devices with subscriber data of enrolled clients, for example the clients 21, 22, 23 and 24. This data structure describes the distribution of storage space assigned to the different subscribed clients among the storage space provided by the enrolled storage devices, e.g. the storage servers 51, 52, 56 (by data bases 54 and 55), 57 and 58. It is possible that the service control unit 61 dynamically adapting this distribution on system requirements, e.g. system load, increase or decrease of storage requirements set by a subscribed client, breakdown of a storage device, enrollment of new storage devices, execution of backup and mirroring procedures.

For example, the client 24 has to invoke the storage service provided by the storage system 5. The communication unit 3 sends a service request message to the service control server 6. The service control server 6 checks the authorization of the client 24 and determines the location of the storage space associated with the client 24 within the storage system 5 by means of data stored in the data base 62. For example, it determines the communication address of the associated storage device or storage devices as well as specific localization data defining the location of the storage space of the client 24 within the storage space provided by the respective addressed storage device.

In the following, the service control unit 61 has two possibilities: First, it resends the determined data to the client 24 which uses this data for accessing the respective storage device or devices directly. When receiving this data, the client 24 establishes a direct connection to this storage device or these storage devices.

According to a second approach, the service control unit 61 uses this data to contact the determined storage devices, establish a session with these storage devices and plays in the following a relay function within the communication between the client 24 and the determined storage device or storage devices. After having performed the localization of the storage space, a secure connection is established between the client 24 and the determined storage device of this storage system. For example, such secure connection is established between the client 24 and the storage server 51. Secure connection means that the communication between these two entities is encrypted so it becomes impossible for third parties to intercept the content of the transmitted data. Further, it is possible that authorization procedures are executed between these entities to ensure that the sending and/or receiving entity receives/sends the data to the correct party.

The data assigned to the storage space of the client 24 is stored in the storage server 51 in encrypted form. Preferably, the data which has to be stored in this storage space is already encrypted by the communication unit 3 by a client specific encryption key and submitted in such form through the established secure connection to the storage server 51. The storage server 51 stores this encrypted data based on the localization data received from the service control unit 61 or the client 24. When retrieving data, the retrieved encrypted data is decrypted by the communication unit 3 by means of an associated client specific decryption key.

In the following, further details of the invention are described by hand of FIG. 2.

FIG. 2 shows the client 24 and the storage server 51.

The client 24 is a computer or a mobile phone, having a hardware platform with a microprocessor, a memory unit and various peripheral components, and various software programs executed by this hardware platform. The functionalities of the client 24 are provided by the execution of this software program by the hardware platform of the client 24. From functional point of view, the client 3 comprises the communication unit 3 and application program 46, 47, 48 and 49. The application programs 46 and 47 use and access storage space provided via the storage service of the storage system 5.

The communication unit 3 provides the application programs 46 and 47 transparent access to such storage space administrated by the storage service. For example, the communication unit 3 provides a transparent representation of this additional storage space within the file system of the client 24 or provides a transparent mirroring of a selected part of the file system of the client 24.

Further, it may provide a kind of virtual drive. From functional point of view, the communication unit 3 comprises an encryption/decryption handler 34, a data transfer handler 33, an internet handler 32 and a modem control handler 31.

The modem control handler 31 and the internet handler 32 provides the necessary functionalities to communicate via the communication network 1 with components of the storage system 5. For example, these handlers provide functionalities to process the DSL protocol stack and the TCP/IP protocol stack (DSL=Digital Subscriber Line; TCP=Transaction Control Protocol).

Further, the internet handler 32 provides additional functionalities to provide a secure peer-to-peer communication, for example functionalities to execute an SSL protocol layer (SSL=Secure Socket Layer).

The data transmission handler 33 controls the invocation of the storage service and processes the specific service control protocols which are used between the service control unit 61 and the storage devices at the one side and the clients on the other side. Further, the data transfer handler 33 plays the role of a multiplexer that enables other components of the client 24 to communicate via the communication network 1. For example, this multiplexer functionality makes it possible to have in parallel to the provisioning of the storage service a WEB based communication with a WEB server.

The encryption/decryption unit is responsible for encryption and decryption of data exchanged with storage devices of the storage system 5 and for buffering the data streams exchanged in this context. From functional point of view, the encryption/decryption unit 34 comprises two encryption/decryption machines 35 and 36, a key data base 37 and a query handler 38.

The encryption/decryption machine 36 is used for encrypting/decrypting of data that has to be stored in the retrieved storage space or has to be retrieved from the remote storage space.

The encryption/decryption machine 35 is used to encrypt or/and decrypt the data structure of the remote storage space.

The key data base 37 comprises the encryption/decryption keys used by the encryption/decryption machines 35 and 36 for performing the respective encryption and/or decryption tasks. Preferably, the keys are client specific, for example constructed by a random process or by taking specific hardware characteristics of the client into account. Further, it is possible that this encryption/decryption keys are user specific, for example stored on a SIM card inserted in the client or constructed out of data stored on this SIM card (SIM=Subscriber Identity Module).

The query control handler 38 controls the storage and retrieval of data, creates queries according to a query language accepted by the storage devices of the storage system 5 and provides an interface between accesses to the file system of the client 24 and the associated query interactions between the client 24 and the storage devices of the storage system 5.

The storage server 51 is composed by one or several interlinked computers, a software platform and application programs executed based on the system platform provided by the hardware and software platform. From functional point of view, the storage server 51 provides a communication unit 511, a data access unit 512 and a data base 514. For example, the data base 514 stores data associated with the storage space provided by the storage service to the client 24.

The communication unit 511 is composed of the communication functionalities for communicating via the communication network 1. For example, this communication unit processes the TCP/IP communication stack and an SSL protocol (SSL=Secure Socket Layer) which enables a secure peer-to peer communication between the client 24 and the storage server 51.

The data access unit 512 receives the storage space localization data from the service control unit 61 or from the client 24. By help of this information, it localizes data assigned to this storage space within the storage space of the data base 514. Further, the data access unit 512 computes the query messages received from the client 24.

For example, the application 46 requests the storage of specific data in the storage space provided by the storage system 5. The query control handler 38 controls the encryption of this data by the encryption/decryption machine 36. Further, it controls the encryption of associating data structure data by the encryption/decryption machine 35. Such data structure data are, for example, directory data assigned to the specific data that describes the positioning of the specific data within the data structure applied on the storage space. The query control handler 38 constructs a query message including a first data set 71, namely the encrypted specific data, and a second data set 72, namely the encrypted data structure data.

The data access unit 512 of the storage server 51 interprets this query message and stores both, the encrypted specific data and the encrypted data structure data in the data base 514. Both, the specific data and the data structure of the specific data are stored in an encrypted form at an area of the data base 514, which is reserved for the storage space of the client 24. Consequently, the data structure applied to this storage area does not represent the data structure of the storage space applied by the client 24 and it is not possible to reconstruct this data structure by scanning the data base 514.

Alternatively, it is also possible that the data structure data are decrypted by the data access unit 512 so it becomes possible for the data access unit 512 to reconstruct the data structure applied by the client 24 and store the encrypted specific data according to this data structure in the data base 514. According to this approach, the data structure applied by the client 24 may be reconstructed by scanning the data base 514.

For example, the application program 47 requests to retrieve data from the storage space provided by the storage service of the storage system 5. The query control handler 38 constructs a query message 73 having data structure data specifying the requested data and, in addition a specific decryption key 74 usable to decrypt data structure data stored in the data base 514. The data access unit 512 has a decryption machine 513 that uses the received decryption key 74 to decrypt data structure data stored in the storage area of the data base 514 assigned to the storage space of the client 24. By help of this decryption process and the data structure data included in the query message 73, the data access unit 512 selects the data specified in the query message 73, retrieves this data from the data base 514 and sends a message back to the client 24 comprising the requested data. This message includes a first data set 75, namely the encrypted requested data, and a second data set 76, namely the encrypted data structure data of this data.

The invention claimed is:

1. A method of providing a client with transparent access to storage space administrated by a storage service, wherein data are exchanged between the client and a storage system providing the storage service via a communication network, the method comprising:
   invoking the storage service for providing the storage space to the client;
   locating the storage space associated with the client within the storage system;
   establishing a secure connection between the client and a storage device of the storage system dedicated to store data assigned to that storage space, the data being transmitted from the client;
   storing the data assigned to the storage space in encrypted form in said storage device; and
   storing data structure data associated with the data in encrypted from in said storage device,
   wherein the data structure data describes a position of the data within structure of the data stored in said storage device, and is transmitted along with the data assigned to the storage space from the client.

2. The method of claim 1, further comprising:
   encrypting, by the client, the data assigned to the storage space by means of a client specific encryption key to generate the data assigned to the storage space in the encrypted form; and
   decrypting, by the client, data retrieved from the storage space by means of an associated client specific decryption key.

3. The method of claim 1, the method further comprising:
   encrypting, by the client, the data structure data by means of a client specific encryption key; and
   submitting a first data set to the storage device including the encrypted data assigned to the storage space, and a second data set to the storage device including the encrypted data structure data, for the storing in said storage device.

4. The method of claim 3, wherein the client submits a query to the storage service, the query including a query request and a client specific decryption key for decrypting the encrypted data structure of the storage space, and
   wherein the storage system decrypts the encrypted data structure data of the storage space by means of the submitted decryption key for computing the query request.

5. The method of claim 3, wherein, on a query request from the client, the storage device submits the encrypted data assigned to the storage space and the encrypted data structure data of the storage space to the client, and wherein the client decrypts the encrypted data structure data for computing the query request.

6. The method of claim 1, wherein the communication network is a public communication network comprising an Internet protocol (IP) network.

7. The method of claim 1, wherein the storage system distributes said storage space among two or more storage devices constituting a distributed storage network.

8. A client with a communication unit adapted to provide transparent access to a storage space administrated by a storage service and to exchange data with a storage system providing the storage service via a communication network, wherein the communication unit is further adapted to invoke the storage service for providing the storage space to the client, to establish a secure connection with a storage device of the storage system dedicated to store data assigned to said storage space, to encrypt the data assigned to the storage space by means of a client specific encryption key, and to transmit the encrypted data assigned to the storage space to the storage device to be stored in encrypted form in the storage device, and wherein the communication unit is further adapted to transmit data structure data to the storage device for storing therein along with the data assigned to the storage space, and wherein the data structure data describes a position of the data within structure of the data stored in the storage device, and is stored in encrypted form in the storage device.

9. The client of claim 8, wherein the data structure data is encrypted at the client and sent to the storage device.

10. A storage system for providing a client with transparent access to storage space administrated by a storage service, the storage system comprising:

a service control unit; and at least one storage device having a communication unit for exchanging data with the client via a communication network, wherein the service control unit is adapted to locate the storage space associated with the client within the storage system, when the client invokes the storage service for providing the storage space, wherein the service control unit is further adapted to support the establishment of a secure connection between the client and the storage device of the storage system dedicated to store data assigned to said storage space, wherein the at least one storage device is adapted to store the data assigned to the storage space in encrypted form, wherein the at least one storage device is further adapted to store data structure data transmitted from the client in encrypted form along with the data assigned to the storage space, and wherein the data structure data describes a position of the data within structure of the data stored in said at least one storage device.

11. The storage system of claim 10, wherein the data structure data is encrypted at the client and sent to the storage device.

* * * * *